Jan. 29, 1952 J. M. THAYER ET AL 2,583,976
METHOD FOR NEUTRON WELL LOGGING
Original Filed July 10, 1948 3 Sheets-Sheet 1
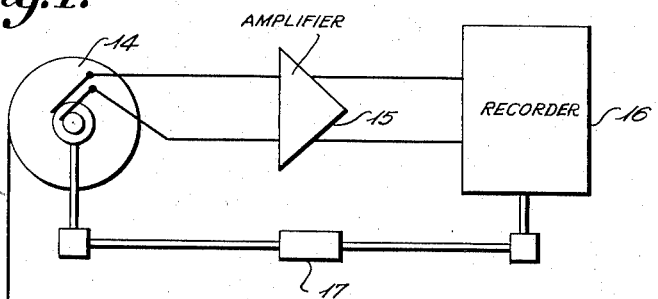
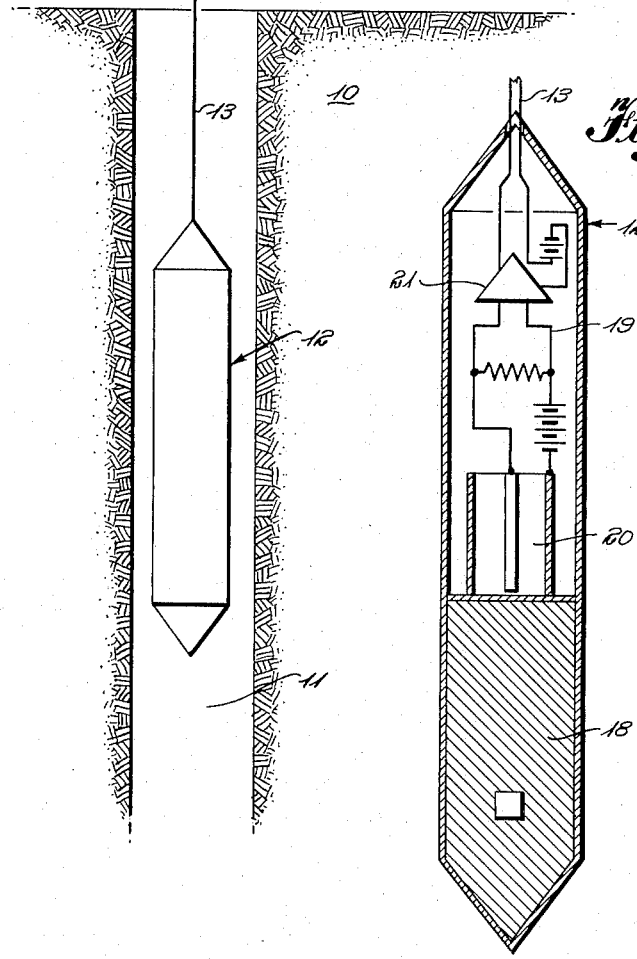
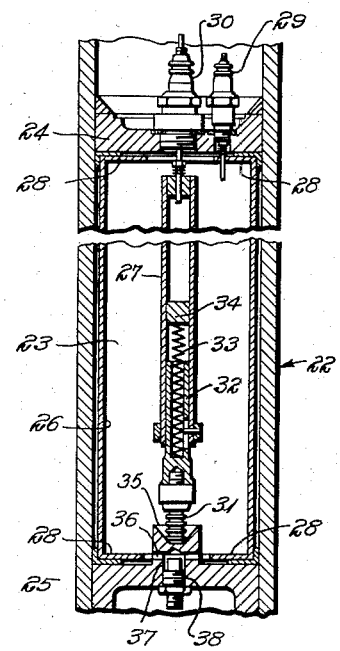
INVENTORS
GILBERT SWIFT,
ROBERT E. FEARON, and
JEAN M. THAYER
BY
James Y. Cleveland
ATTORNEY Jan. 29, 1952 J. M. THAYER ET AL 2,583,976
METHOD FOR NEUTRON WELL LOGGING
Original Filed July 10, 1948 3 Sheets-Sheet 2
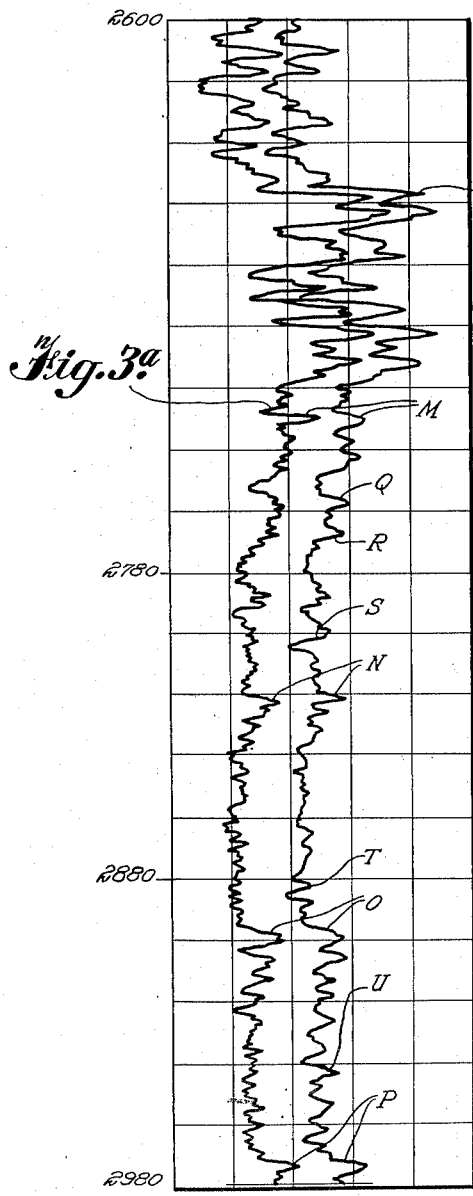
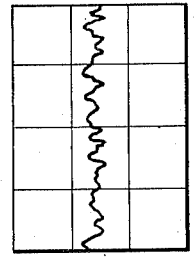
INVENTORS
*GILBERT SWIFT,*
*ROBERT E. FEARON,* and
*JEAN M. THAYER*
BY
ATTORNEY

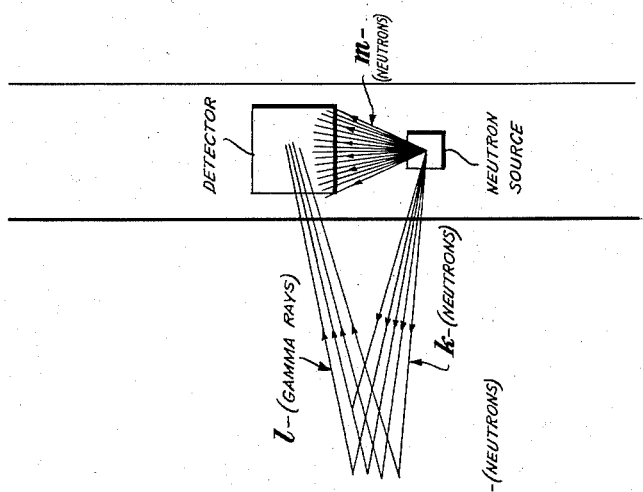
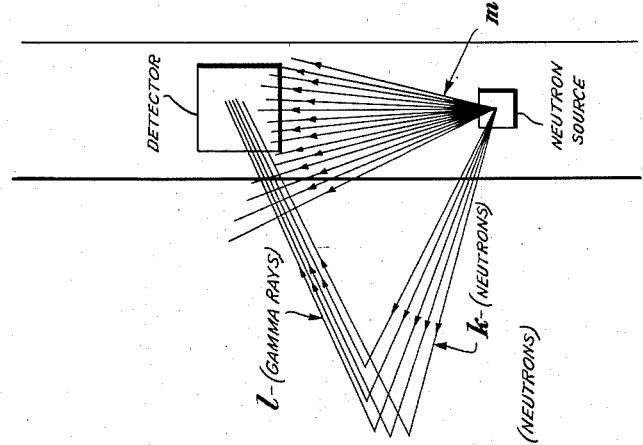
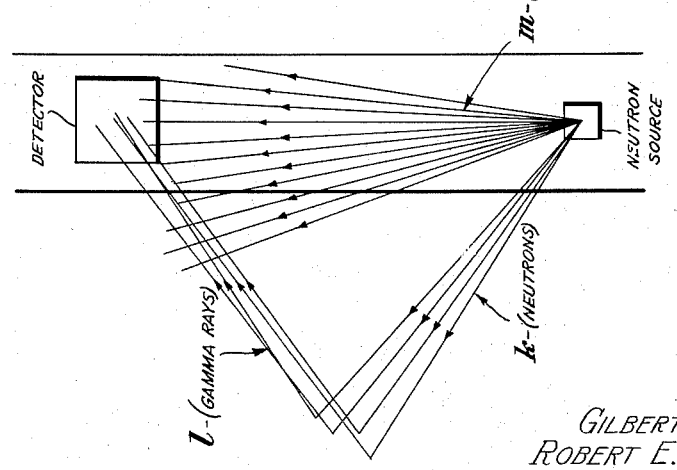
INVENTORS
GILBERT SWIFT,
ROBERT E. FEARON, and
JEAN M. THAYER

UNITED STATES PATENT OFFICE 2,583,976

METHOD FOR NEUTRON WELL LOGGING

Jean M. Thayer, Gilbert Swift, and Robert E. Fearon, Tulsa, Okla., assignors to Well Surveys, Incorporated, Tulsa, Okla., a corporation of Delaware Original application July 10, 1948, Serial No. 38,138. Divided and this application May 19, 1950, Serial No. 168,922

1 Claim. (Cl. 250—83.6)

This invention relates to the art of subsurface exploration, principally oil well logging, and more particularly to a radioactivity type of exploration in which a source of fast neutrons is used in conjunction with a gamma-radiation detector. Commercially such a radioactivity log made by the use of a source of fast neutrons and a gamma-radiation detector is known as a neutron log. This is true despite the fact that no neutrons are directly detected.

In recent years neutron oil well logs have achieved a degree of popularity not shared by the logs made by other methods. This is believed to be attributable to the fact that, in a substantial proportion of surveys made, they correlate more accurately with the lithology of the strata penetrated by the well. These logs have been made by traversing the well with a source of neutrons, usually 300 to 500 millicuries of radium intimately mixed with a predominant proportion by weight of powdered beryllium, to irradiate with fast neutrons the strata lining the well and simultaneously traverse the well with an associated gamma-radiation detector to detect and record gamma radiation in correlation with the depth at which they are detected. The detector, for example an ionization chamber, and the source are assembled to make a single unit, with the detector vertically spaced from the source.

We have discovered that, regardless of the type of neutron source used in neutron well logging, there is recorded along with the desired effect, namely, the intensity of gamma radiation originating with neutron processes in the formations, an undesired effect which should be minimized or largely eliminated from the neutron log. This effect occurs at random intervals of time and is evidenced by sudden transitions, or fluctuations, of appreciable magnitude in the trace of the log. When these transitions occur on the trace, along with transitions of comparable magnitude which are occasioned by changes in the lithological characteristics of the formations, the log is incapable of being properly interpreted. Furthermore, these random transitions, depending on the time of occurrence and the direction of the transition on the log that is due to a change in the lithological characteristics of the formations, can overemphasize, obscure, or even reverse the wanted transition. In fact, the degree of reproducibility of a log is measured by the relative magnitudes of the unwanted random transitions and the wanted transitions that are occasioned by variations in lithological characteristics of the formations.

We have discovered that these random fluctuations or transitions are attributable to two effects. One of these effects is that which is inherent in all radiation emitters, namely, the statistical variation in the intensity of the neutrons emitted by the source. The other effect is that produced by neutron-heavy ionizing-particle processes occurring within the gamma-ray detector.

The first of these effects can be minimized or largely eliminated by using a neutron source that is of such strength that the ratio of desired effect to undesired effect is sufficiently great that the sensitivity of the recording system can be reduced to a point where the undesired effect is largely eliminated and the desired effect can still be recorded without losing the characteristics which serve as an index to the formations being surveyed.

The second effect is attributable to neutrons which have passed more or less directly from the source to the interior of the detector and there reacted with some material inside the detector (in an ionization chamber, for example, the aluminum of which the central electrode is formed, the iron or steel of which the outer electrode is formed, or the ionizable medium) to produce a proton or an alpha particle. Protons or alpha particles, in their path of travel through the ionizable medium in the detector, produce enough ions to cause a considerable variation in the current output from the detector. For a detector having a given cross-sectional area, the opportunities for producing this effect vary with the distance between the source and the detector in accordance with the inverse-square law, multiplied by the absorption effect for intervening material. The randomness of the effect, however, is attributable to the fact that only occasional neutrons are captured and release energy in the production of protons or alpha particles in the detector. We have found that the average rate of occurrence of these processes can be reduced by increasing the distance between the detector and the neutron source, and by reducing the cross-sectional area of the detector to present a smaller target for the direct neutrons. Neither of these dimensional factors, however, can be altered very much because of other considerations.

We have found that this effect can also be minimized by using a stronger source, that is, one which emits more fast neutrons per unit of time. By using a stronger source more neutrons per unit of time will be emitted in all directions and the detected gamma radiation arising from neutron processes in the formations will increase, resulting in a more intense component of useful current flowing in the detector circuit. While the increase in the number of neutrons emitted per unit of time by the source will proportionally increase the opportunities for neutron-proton or neutron-alpha particle reactions to occur, we have nevertheless found that the resultant effect is only an increase in the average rate of occurrence of these reactions and not an increase in the magnitude of the ionizing process produced by each particle released in the ionizable medium. Therefore, the use of a stronger source increases the intensity of the wanted component of current flowing in the detector circuit without correspondingly increasing the magnitude of the fluctuations due to the random processes. The sensitivity of the detecting system can then be reduced to minimize its response to the random processes without seriously impairing the useful intelligence depicted by the log.

Although certain ways have been described above for minimizing the effect produced by these random neutron processes, we have also discovered that this effect can be largely eliminated. This can be accomplished by using a detector which employs as an ionizable medium a substance which does not emit heavy ionizing particles when bombarded with neutrons, and by forming all metallic surfaces that are exposed to the ionizable medium inside the detector of an electrical conductor that will not emit heavy ionizing particles, such as protons and alpha particles, when bombarded with neutrons. We have discovered that argon and tin, respectively, are ideally suited for these purposes. The electrically conductive elements of the ionization chamber which have surfaces exposed to the ionizable medium inside the chamber need not be formed wholly of tin but may be plated with tin to a thickness, for example, of a few thousandths of an inch, which plating will not emit heavy ionizing particles when bombarded with neutrons, and will absorb heavy particles, such as protons and alpha particles, that are emitted by the underlying plated metals when they are bombarded with neutrons, thereby preventing the heavy particles from reaching the ionizable medium in the chamber. Tellurium may be similarly employed.

It is the primary object of this invention to determine the causes of certain sudden random fluctuations which have occurred in and impaired neutron logs heretofore made, and to provide a solution for this difficulty. It is an object of the invention to minimize the effect of these random fluctuations on the log to tolerable proportions by increasing the desired radiation reaching the detector without correspondingly increasing the magnitude of said fluctuations. It is also an object to reduce the frequency of occurrence of these random fluctuations on the log by minimizing the cross-sectional area of the detector and by enlarging the spacing between the detector and the neutron source without, however, seriously disturbing the optimum spacing requirements based upon other considerations. It is a further object to minimize, or wholly or largely eliminate, these random fluctuations by ascertaining and suppressing the phenomena from which they result. It is a specific object of the invention to accomplish this by forming surfaces that are exposed to the ionizable medium inside the detector of a substance that will not emit heavy ionizing particles when bombarded by neutrons, and that will absorb such particles that may be generated by bombardment of nearby metal parts and that otherwise might find their way into the ionizable medium. It is a further specific object of the invention to minimize the opportunities for this effect to occur by using in the detector a substance as the ionizable medium which will not emit heavy ionizing particles when bombarded with neutrons.

Other objects and advantages of the present invention will become apparent from the following detailed description when considered with the drawings, in which Figure 1 is a diagrammatic illustration of a neutron logging operation;

Figure 2 is an enlarged vertical sectional view of the subsurface instrument;

Figures 3a and 3b are standard neutron logs which have been successively made in the same well which illustrate the effect of random transitions on the reproducibility of neutron logs;

Figure 3c is a record of background noises and random transitions made by stopping the subsurface instrument in a well and allowing the recorder strip to be driven at its normal speed;

Figures 4a to 4c illustrate the manner in which the number of neutrons entering the detector varies with the spacing between the neutron source and the detector and also the paths followed by the useful radiation in the formations; and Figure 5 is a fragmentary view of the subsurface instrument showing in vertical section details of an ionization chamber type of gamma-radiation detector.

Referring to the drawings in detail, particularly Figure 1, there is illustrated a well surveying operation in which a fragment of the surface 10 of the earth is shown in vertical section. A well 11 penetrates the earth's surface and may or may not be cased. Disposed within the well is the subsurface instrument 12 of the well logging system which additionally comprises a cable 13 for suspending the instrument in the well, a drum 14 from which cable is paid out or on which cable is wound when causing the capsule 12 to traverse the well, electrical connections from slip-rings on the axle of the drum 14 to an amplifier 15, which in turn is electrically connected to a recorder 16 in a conventional manner. Recorder 16 is driven through a transmission 17 by the drum 14 as the cable is paid out from or wound thereon. The record thus made by the recorder as the capsule 12 traverses the drill hole will be in correlation with depth.

As shown in Figure 2, the capsule 12 comprises a neutron source 18 forming the bottom portion thereof and a gamma-radiation detecting system indicated generally as 19 which makes up the upper portion of the capsule. The gamma-radiation detecting equipment 19 can be such as that disclosed in Patent No. 2,349,225 or such as that shown in Patent No. 2,390,965. For purposes of describing this invention an ionization chamber 20 is shown as the radiation sensitive element. As disclosed in Patent No. 2,308,361, the operation of a system of this character when producing a neutron log is that the capsule 12, made up of a source of neutrons 18 and a gamma-radiation detection system 19, is caused to traverse a well. Neutrons emitted from the source enter the walls of the well and, by nuclear reaction with matter contained in the walls, produce gamma radiation in amounts proportional to the lithological characteristics of the materials of which the walls are formed. These gamma radiations produced by nuclear reactions in the strata are detected by the gamma-radiation detector 20 by producing electrical signals that are related in magnitude to the intensity of the gamma radiation detected, and these signals are amplified by an amplifier 21 and transmitted over conductors contained in the cable 13 to the surface of the earth, where if necessary, they are further amplified by the amplifier 15 and recorded by the recorder 16 in correlation with the depth at which they were detected. It is to be understood that the present invention is not limited to an ionization chamber type detector but applies to counters as well.

Commercially a log made by the above-described operation is known as a neutron log. This is true although no neutrons are directly detected and recorded. The record is one of gamma radiation intensity versus depth. Those working in the art have heretofore assumed that such a log truly represents an effect produced in the strata by irradiating the strata with neutrons. That is, the log was purported to be a measurement of the gamma radiation produced by the nuclear reaction of neutrons and elements contained in the strata versus depth. Research, however, has shown us that in many instances the standard neutron log is unreliable since it cannot be reproduced in the same well while working under the same conditions. We have discovered that the inability to reproduce the standard neutron log under the same working conditions is attributable to the presence on the log of random transitions that are of substantially the same order of magnitude as the transitions that are caused by changes in lithological characteristics of the formations being surveyed.

The manner in which these random transitions affect the neutron log is illustrated in Figures 3a to 3c. Figures 3a and 3b are two neutron logs which were made in the same well under identical conditions. Figure 3c shows a record which was made by stopping the subsurface instrument at a particular depth in the well and driving the recorder strip at its customary speed. The trace, so recorded, is a record of the random transitions that occur versus time. Now compare the two logs of Figures 3a and 3b while keeping in mind the magnitude of the random transitions shown on the trace of Figure 3c. At a glance the logs appear to be duplicates, but a careful examination of them will show that they differ at many points, particularly where the transitions are small. The transitions at K, L, M, N, O, and P, for example, are unquestionably due to changes in lithological characteristics of the formations being traversed. These transitions, although small in magnitude, are in phase and are of approximately the same magnitude. With two logs of the same well before him, the interpreter can say with certainty that these are transitions caused by change in formations, because they appear at exactly the same point on both logs. Transitions, such as those shown on the log of Figure 3b at Q, R, S, T, and U, may, or may not, be due to changes of lithological characteristics of the formations. They are of the same order of magnitude as the transitions at K, L, M, N, O, and P, but they do not appear on both logs. Since the transitions at Q, R, S, T, and U are also of the same order of magnitude as the random transitions shown on the trace in Figure 3c, it is possible that they are random transitions, such as those on the trace of Figure 3c. These transitions therefore become meaningless even when two logs of the same well are considered. An interpretation of the small transitions of either one of the logs, when considered alone, would be impossible for the interpreter would not know which of the small transitions are attributable to changes in formations and which are due to random processes. Additionally, important formation changes would not be portrayed by the log if an out of phase random process occurred at the same time that the formation being surveyed changed. Therefore, depending upon the direction of the transition due to formation change, a random transition can over or under accentuate a desired transition, or it can even nullify the desired transition.

As pointed out above, these random transitions are attributable to two causes, one of which is the statistical variation in the intensity of the neutron flux emitted by the source and the other is neutron-heavy ionizing particle processes which occur in the detector.

We have discovered that the random transitions that are due to statistical variations in the neutron flux emitted by the source can be sufficiently minimized by increasing the neutron flux emitted by the source to approximately $5. \times 10^6$ neutrons per second. This can be accomplished by increasing the amount of alpha rayer in the mixture with beryllium. Increasing the source strength results in an increase in the intensity of the gamma radiation produced in the formations and detected by the measuring instrument. A direct consequence of this is an increased ratio of magnitude of useful signals to the magnitude of the signals representing statistical variations. A ratio of at least 3 to 1 will make logs which can be reproduced with the desired degree of certainty. This allows the sensitivity of the recording system to be reduced to a point where the random transitions are minimized or largely eliminated from the trace of the log and the transitions due to changes in formations are still recorded without appreciable loss of character.

Now consider the random transitions that are recorded on the trace of the neutron log and which are caused by neutron-heavy particle processes that occur in the gamma-radiation detector. These transitions are caused by neutrons travelling more or less directly from the source into the detector and there reacting with some substance, such as the substance of which the electrodes are made or with the ionizable medium itself, to produce protons or alpha particles. The protons or alpha particles so produced will, in their paths of travel through the ionizable medium, produce numerous electrons which are collected by the detector-collector electrode, resulting in bursts of current flow in the electrode circuit which, when amplified and recorded, produce outstanding random transitions. These random transitions can also be minimized in the manner described above by increasing the strength of the source.

We have also discovered that the random transitions that are attributable to neutron-heavy particle reactions that occur in the detector can also be minimized by critically spacing the neutron source from the detector. This is illustrated in Figures 4a to 4c. Fast neutrons are emitted from the source in all directions and the number which enter a detector having given dimensions, and which have an opportunity to react with a substance therein, varies inversely as the square of the distance between the point where the neutron-producing reactant materials are located and the detector. In Figures 4a to 4c there are shown three conditions of spacing of neutron source from the detector in a well. Figure 4a shows generally the paths $k$ of the neutrons which enter the strata and there produce gamma radiation. The useful gamma radiation so produced reaches the detecting instrument by the paths $l$. Although the paths $k$ and $l$ are shown only on one side of the instrument, it is to be understood that the neutrons are emitted in all directions and the paths appear on all sides of the instrument. Neutrons which travel directly from the source to the detector follow the paths $m$. The number of neutrons that follow the paths $m$ and enter the detector vary inversely with the square of the distance between the source and detector. As pointed out above, not all of the neutrons which enter the detector produce protons or alpha particles which contribute, by their ionization processes, a component of current to that flowing in the electrode circuit.

For the purpose of comparing the effects produced in the detector by the gamma radiation produced by neutrons in the strata and the protons or alpha particles produced in the detector by neutrons which have travelled substantially directly from the neutron source, let us first, for purpose of explanation only, assume that one out of each of $n$ neutrons entering the detector produces an ionizing proton or alpha particle, and assign arbitrary values to the current components that would flow in the electrode circuit. For the spacing shown in Figure 4a, let us assign a value of 3 to the component of electrode current due to gamma rays produced in the strata by neutrons, and .03 to the component of current that would flow in the electrode circuit due to ionizing processes produced by protons. We would then have a ratio between the components of 100 to 1. Now referring to Figure 4b, the spacing between the source and detector shown there has been decreased to a point where that component of current that would flow in the electrode circuit due to gamma rays produced in the strata by neutrons would be doubled. This reduction of the spacing would, under the assumption made in connection with Figure 4a, now increase the current component due to protons to .12, giving a magnitude ratio of useful signal to undesired signal of 50 to 1, instead of the 100 to 1 obtained under the condition of Figure 4a. In Figure 4c the source is shown still closer to the detector, spaced therefrom by a distance that will cause the useful signal to increase to 12. That component that would flow in the electrode circuit, the unwanted signal, would increase to approximately .5, reducing the ratio of desired signal to unwanted signal to 24 to 1. It is seen that this undesired effect increases from that for long spacing between source and detector slowly at first as the spacing decreases and rapidly for very short or close spacing. Use of a relatively great spacing thus serves to minimize or even largely eliminate this phenomenon. Too great a spacing, however, results in the decrease of the wanted signal to such an extent that the repeatability of the log is impaired. Thus it is seen that as the spacing between source and detector is varied from very close to very far the repeatability at first improves, as the processes in the detector caused directly by neutrons diminish and later again becomes poor as the intensity of the wanted radiation diminishes.

There are therefore maximum and minimum limits of spacing which can be employed with a source of given strength in order to achieve an acceptably repeatable log at a reasonable logging speed. When using sources of scarce or costly materials these limits become of great importance in order that satisfactorily repeatable logs may be obtained with a minimum amount of source material. We have found that when using detectors in which no attempt has been made to minimize or eliminate the direct interaction of neutrons with the materials inside the detector that the satisfactory limits for operation of a weak source, such as one which emits $10^6$ neutrons per second, lie between 6 and 14 inches. As the strength of the source is increased, as for example to one which emits $0.5 \times 10^7$ neutrons per second, the satisfactory range of spacings increases to 4 to 20 inches. As the effects inside the detector produced by direct interaction with neutrons are reduced the minimum satisfactory spacing decreases. For example, with a detector in which this effect has been reduced by a factor of ten from that of a detector of the type shown in Figure 5 and more fully disclosed in Patent No. 2,390,965, the minimum permissible spacing for a weak source will decrease from 6 to about 3 inches, and with a detector in which this effect has been entirely eliminated a spacing of zero inches, meaning that the neutron source is located within the detector, can be tolerated.

We have further found that the random transitions that are attributable to neutron-heavy particle reactions in the detector can be largely eliminated by forming all metallic surfaces that are exposed to the ionizable medium inside the detector of a metal that will not emit heavy ionizing particles, such as protons and alpha particles, when bombarded by fast neutrons, and preferably employing an ionizable medium which also will not emit heavy ionizing particles when bombarded by fast neutrons. One such detector is shown in vertical section in Figure 5. Although this detector forms a part of the subsurface system that is contained in a capsule, only that fragment of the capsule which houses the detector is shown.

Referring to the drawings, the capsule or casing 22 is divided into a plurality of compartments, one of which, compartment 23, contains an ionization chamber that is defined by the inner walls of the casing 22 and top and bottom partitions 24 and 25, respectively. The ionization chamber thus formed contains an ionizable medium such as argon for the detection of gamma radiation. There are concentrically disposed in the ionizable medium within the ionization chamber two electrodes, an outer cylindrical electrode 26 and a central electrode 27. The outer electrode is fixed in spaced relation to the casing 22 by means of a dielectric material 28. Since the ionizable medium in the chamber is under pressure, electrical connection is made to the outer electrode from a point outside the ionization chamber by means of the pressure plug 29. Similarly, connection is made to the central electrode by means of a second pressure plug 30. Pressure plugs 29 and 30 are constructed in much the same manner as spark plugs for an internal combustion engine. Generally speaking, the only differences are the elimination of the electrode that is carried by the outer shell and the elongation of the inner end of the central electrode of the plug.

The bottom end of the ionization chamber central electrode is supported by an insulator 31.

The insulator is secured to a tubular element 32 that is adapted to telescopically engage the inner surface of the tubular central electrode 27. Element 32 is adapted to fit snugly inside the electrode but slide freely therein. Insulator 31 is urged downwardly by a spring 33 whose bottom end fits inside of element 32 and presses thereagainst and whose top end butts against a plug 34 that is fixed to the inner surface of the inner electrode 27. Insulator 31 is urged downwardly by the spring 33 to engage a bearing cup 35 that is formed in an upraised portion of the center of partition 25. Passageways 36 are formed horizontally in the upraised portion of partition 25 and these passageways communicate with a central opening 37 in which is secured a valve 38. Valve 38 is provided for the purpose of charging the ionization chamber with an ionizable medium, such as argon. Such an ionization chamber is more fully disclosed in Patent No. 2,390,965.

The novel features of the present invention as applied to such a chamber comprise using an ionizable medium such as argon and forming all electrically conducting surfaces inside the chamber that are exposed to the ionizable medium with an electrical conductor, such as tin or tellurium, which medium and electrical conductor will not emit heavy ionizing particles, such as protons or alpha particles, when bombarded with fast neutrons. This can be done by making the electrodes 26 and 27 within the ionization chamber of tin or tellurium, or by coating or plating them with tin or tellurium to a thickness of at least 0.002 inch. The inner surface of housing 22 which is exposed to the ionizable medium as well as the inner surfaces of partitions 24 and 25 should also be coated or plated with tin or tellurium. When using a coating or plating of tin or tellurium, even though neutrons pass through the coating or plating and react with the plated metals, all heavy particles produced thereby would be absorbed by the tin or tellurium and thus not be allowed to enter the ionizable medium to produce the undesired effect.

In the construction of such devices as are herein described it is necessary to be careful to eliminate boron and lithium from the internal elements of the gamma-ray detecting device.

The elimination, as just described, of the undesired effect produced by neutron-proton or neutron-alpha particle reactions in the detector makes it possible to reduce the spacing between the neutron source and detector when desired to augment the desired effect from the strata of rock.

The claim of this application is directed to a method and apparatus for minimizing or largely eliminating random transitions, such as those caused by fast neutron-heavy particle processes or slow neutron-boron or -lithium processes, which occur in the detector. Other novel features disclosed but not claimed are being made the subject matter of companion applications.

We claim:

A method of determining the space between a given source of neutrons and a given detector in a neutron well logging system that will minimize neutron-heavy particle processes which occur in the detector as a result of neutrons impinging on metallic elements of the detector that are exposed to the ionizable medium that comprises selecting a spacing that lies within the range of from 2 inches to 30 inches, making two neutron logs in a well in succession with that spacing, determining the ratio between the magnitudes of the random transitions on the logs and the average transitions occasioned by changes in formations penetrated by the well being logged, readjusting the spacing of the neutron source from the detector to make said ratio at least 1 to 3, and making a neutron log in any similar well while using the adjusted spacing.

JEAN M. THAYER.
GILBERT SWIFT.
ROBERT E. FEARON.

REFERENCES CITED

The following references are of record in the file of this patent:

UNITED STATES PATENTS

| Number | Name | Date |
| --- | --- | --- |
| 2,289,926 | Neufeld | July 14, 1942 |
| 2,469,463 | Russell | May 10, 1949 |
| 2,508,772 | Pontecorvo | May 23, 1950 |

OTHER REFERENCES

"Review of Scientific Instruments," Evans et al., December 1936, vol. 7, pages 441-449.